(12) United States Patent
McCaughan et al.

(10) Patent No.: US 6,846,428 B2
(45) Date of Patent: Jan. 25, 2005

(54) THIN FILM LITHIUM NIOBATE AND METHOD OF PRODUCING THE SAME

(75) Inventors: Leon McCaughan, Madison, WI (US); Thomas F. Kuech, Madison, WI (US); Dovas A. Saulys, Madison, WI (US); Vladimir A. Joshkin, Madison, WI (US); Aref Chowdhury, Springfield, NJ (US)

(73) Assignee: Wisconsin Alumni Research Foundation, Madison, WI (US)

( * ) Notice: Subject to any disclaimer, the term of this patent is extended or adjusted under 35 U.S.C. 154(b) by 259 days.

(21) Appl. No.: 10/097,441

(22) Filed: Mar. 14, 2002

(65) Prior Publication Data

US 2002/0182322 A1 Dec. 5, 2002

Related U.S. Application Data

(60) Provisional application No. 60/277,164, filed on Mar. 20, 2001.

(51) Int. Cl.$^7$ ............................ B44C 1/22; C03C 15/00; C03C 25/68; C23F 1/00; C25F 3/00
(52) U.S. Cl. .................... 216/101; 427/109; 427/126.3; 427/255.19
(58) Field of Search .............. 216/76, 101; 427/255.19, 427/126.3, 109

(56) References Cited

U.S. PATENT DOCUMENTS

| | | | |
|---|---|---|---|
| 4,940,302 A | | 7/1990 | Houk et al. |
| 4,993,361 A | * | 2/1991 | Unvala .................. 118/723 FI |
| 5,271,957 A | | 12/1993 | Wernberg et al. |
| 5,728,603 A | | 3/1998 | Emesh et al. |
| 6,069,729 A | | 5/2000 | Gill et al. |
| 6,172,791 B1 | | 1/2001 | Gill et al. |
| 6,545,791 B1 | | 4/2003 | McCaughan et al. |

OTHER PUBLICATIONS

Kazuto Noguchi, "Millimeter–Wave Ti:LiNbO3 Optical Modulators," *J. of Lightwave Technology*, vol. 16, No. 4, Aug. 1998, pp. 615–619.

Kazuto Noguchi, et al., "A Broadband Ti:LiNbO3 Optical Modulator with a Ridge Structure," J. of Lightwave Technology, vol. 13, No. 6, Jun. 1995, pp. 1164–1168.

M. Levy, et al., "Fabrication of single–crystal lithium niobate films by crystal ion slicing," Appl. Phys. Lett., vol. 73, No. 16, Oct. 19, 1998, pp. 2293–2295.

V.A. Joshkin, et al., "Growth of oriented lithium niobate on silicon by alternating gas flow chemical beam epitaxy with metalorganic precursors," Appl. Phys. Lett., vol. 76, No. 15, Apr. 10, 2000, pp. 1–3.

D. Saulys, et al., "An examination of the surface decomposition chemistry of lithium niobate precursors under high vacuum conditions," J. of Crystal Growth, vol. 17, 2000, pp. 287–301.

I.–L. Gheorma, et al., "Thin Layer Design of X–Cut LiNbO3 Modulators," IEEE Photonics Technology Letters, vol. 12, No. 12, Dec. 2000, pp. 1618–1620.

V. Joshkin, et al., "Two–stage Growth of Patterned Epitaxial Lithium Niobate for Photonic Application," IUVSTA 15th International Vacuum Congress (IVC–15), Nov. 1, 2001, abstract printed from worldwide web Oct. 30, 2001.

* cited by examiner

*Primary Examiner*—P. Hassanzadeh
*Assistant Examiner*—Roberts Culbert
(74) *Attorney, Agent, or Firm*—Foley & Lardner LLP (57) ABSTRACT

Metal oxide films such as lithium niobate are formed in an amorphous state on a substrate such as lithium niobate and can be readily etched by conventional liquid or dry etchants. The amorphous film may then be converted by annealing to a crystalline form well suited to formation of electro-optical devices.

42 Claims, 6 Drawing Sheets

THIN FILM LITHIUM NIOBATE AND METHOD OF PRODUCING THE SAME

REFERENCE TO RELATED APPLICATION

This application claims the benefit of U.S. provisional application No. 60/277,164, filed Mar. 20, 2001, the disclosure of which is incorporated herein by reference.

REFERENCE TO GOVERNMENT RIGHTS

This invention was made with United States government support awarded by the following agency: NSF 9632527 and 0079983. The United States government has certain rights in this invention.

FIELD OF THE INVENTION

This invention pertains generally to the field of crystalline metal oxide films and methods of producing such materials.

BACKGROUND OF THE INVENTION

Ferroelectrics such as lithium niobate (an oxide) possess a large non-resonant second-order optical nonlinearity which makes such materials useful for fabrication of a variety of optical and opto-electronic devices. Examples include optical switches and modulators, frequency shifting devices, polarized controllers, pulsed waveguide lasers, surface-acoustic-wave filters, and acousto-optic devices. These materials also often possess additional useful properties, such as piezoelectric, elasto-optic, and pyroelectric effects. Conventionally, such devices are fabricated from the bulk crystal material (typically a wafer about 0.5 to 1 mm thick), although most devices use only a small fraction of the surface volume of the material. Because these oxides tend to be chemically very inert, there are only a very limited number of surface modification tools (e.g., thermal diffusion) that can be used for fabrication purposes. It would be desirable if it were possible to deposit thin films of the ferroelectric materials on a substrate while controlling the composition and purity of the deposited materials. It would also be desirable if it were possible to deposit the film in a form which can be easily etched or ablated, permitting the fabrication of photolithograhically defined two-dimensional and three-dimensional structures on a planar substrate.

Numerous attempts have been made to grow crystalline $LiNbO_3$ and other $ABO_3$ ferroelectrics (where A and B are other metals) on various substrates. $LiNbO_3$ thin films, for example, have been grown on semiconductors (e.g., Si and Ge), on dielectrics (e.g., MgO and $Al_2O_3$) and on ferroelectrics (e.g., $LiTaO_3$ and $LiNbO_3$ itself). In general, the objective of such deposition processes is to produce a crystalline thin film, since the crystalline form of the material usually has the best optical and electronic film qualities (e.g., optical transparency and nonlinear properties). Crystalline forms (e.g., single crystal textured, or polycrystalline) forms of these materials, however, etch very slowly with etchants current available. For example, a 50% aqueous solution of HF will have a negligible effect on single crystal $LiNbO_3$, and reactive ion etching (RIE) using $CCl_2F_2:Ar:O_2$ results in only about 3 µm/h etch rate. These etch rates are comparable to the etch rates for the masking materials that are used, making high resolution geometries essentially infeasible and resulting in very rough sidewalls with large optical losses. See J. L. Jackel, et al., "Reactive Ion Etching of $LiNbO_3$," Applied Phys. Lett., Vol. 38, 1981, pp. 970 et seq.

Among the devices that utilize $LiNbO_3$ are traveling wave electro-optic modulators. $LiNbO_3$ traveling wave modulators are currently formed utilizing a $LiNbO_3$ substrate containing a Mach-Zehnder waveguide geometry, a buffer layer (a thin dielectric film such as $SiO_2$ isolating the light in the waveguide from the metal electrodes), and metal electrodes in the form of a microwave strip line. State of the art commercial traveling wave modulators (TWMs) using these structures have a 7 GHz bandwidth (corresponding to 10 Gb/s maximum transmission rate for non-return to zero (NRZ) coding) and an operating voltage at the maximum speed of $V_\pi$@7 GHz=6 volts. At 40 Gb/s (30 GHz bandwidth, NRZ), numerical simulation shows that the conventional $LiNbO_3$ TWM requires a drive voltage of about 9 volts with an electrode length L=1.6 cm and thickness $t_e$=30 µm. However, the available gallium arsenide drive electronics at this bit rate has a maximum voltage swing of about ±4.5 volts. Thus, the conventional TWM structure would theoretically be capable of attaining the 40 Gb/s bit rate, but there is no margin of error to allow for processing variability. To account for thermal voltage degradation and process variations in the electronics, a margin of error of about 10% must be allowed (i.e., the TWM must be capable of operating at ±4 volts).

Noguchi, et al. ("A Broadband Ti:$LiNbO_3$ Optical Modulator with a Ridge Structure," J. of Lightwave Technology, Vol. 13, No. 6, June 1995, pp. 1164–1168) have shown that etching 3–4 µm deep ridges in the $LiNbO_3$ above the Mach-Zehnder waveguides produces a better overlap between the optical and microwave fields, thereby allowing the drive voltage to be reduced. However, difficulties are encountered in making commercial devices having such structures because, as noted above, the etch rates of crystalline $LiNbO_3$ are very slow. The resulting surfaces are rough, significantly increasing the waveguide's propagation loss. In addition, the reliability of devices made using present etching techniques is questionable. A variation of this approach is shown in U.S. Pat. No. 6,172,791 to Gill, et al., in which ion implantation is used to allow etching at an angle to form ridges with reentrant sidewalls to further shape the electric field in the ridges.

SUMMARY OF THE INVENTION

In accordance with the present invention, metal oxide films, in particular lithium niobate, are formed in a state in which the films are able to be easily etched by chemical, kinetic, or optical interactions (or combinations thereof) with the deposited film, with the etched films being subsequently converted into a crystalline form that is well suited for applications in electro-optic and optical systems. Continuous, uniform amorphous films, (e.g., amorphous lithium niobate) are formed in accordance with the invention on a substrate (including single crystal lithium niobate), the regions in which the thin film is to be removed is then defined, such as by masking (e.g., as in photolithographic processes), and the film material in the exposed regions is then etched or ablated without affecting the substrate or the remaining masked thin film. The remaining deposited film is then annealed to crystallize the film to a state suitable for optical or electronic applications.

In accordance with the invention, a process for forming a crystalline film of lithium niobate includes providing a crystalline substrate, growing an amorphous film of lithium niobate on the substrate by chemical vapor deposition, typically at pressures between 0.1 mm Hg and at or near atmospheric pressure, and then annealing the lithium niobate film for a time and at a temperature sufficient to convert the film from an amorphous to a crystalline form. It is found that the growth of the amorphous film by chemical vapor deposition occurs much more rapidly than conventional lower pressure growth of lithium niobate crystalline films. The method of the invention may also be carried out by growing an amorphous film of lithium niobate on the substrate in a chemical vapor deposition chamber in an atmosphere containing niobium and lithium precursors and an organic chlorinating agent, before annealing the lithium niobate film. The use of the organic chlorinating agent results in higher growth rates than by conventional processes. The lithium niobate film may be formed on a lithium niobate substrate as well as other substrates, such as lithium tantalate ($LiTaO_3$) and sapphire ($Al_2O_3$). Typically, the step of growing an amorphous film is carried out at temperatures at or below about 600° C.

It is found that, in accordance with the present invention, the amorphous film of lithium niobate can be readily etched utilizing conventional wet or dry etchants. After surface features are etched in the amorphous film, the film may then be converted to a crystalline form by annealing. Typical annealing temperatures are in the range 900° C. to 1100° C. and typical annealing times are in the range of 0.5 hour to 1.0 hour.

An advantage of the present invention is that the depth of features such as trenches is not dependent on the ability to carefully control the etch rates of the amorphous film. If the substrate underlying the amorphous lithium niobate is chemically inert (e.g., crystalline lithium niobate), the depth of the etched features can be defined by the thickness of the amorphous film. That is, the inert substrate naturally serves to stop the etch process.

The present invention may also be carried out by depositing an easily etched layer, such as a layer of $SiO_2$, in a pattern on a base substrate. A polycrystalline layer of lithium niobate may then be deposited over the patterned layer and onto the base substrate where it is exposed. The patterned layer (e.g., $SiO_2$) and the lithium niobate over it may then be etched away, leaving the lithium niobate that was deposited directly on the base substrate. The remaining structure is then annealed to crystallize the remaining lithium niobate layer.

Further objects, features and advantages of the invention will be apparent from the following detailed description when taken in conjunction with the accompanying drawings.

DETAILED DESCRIPTION OF THE INVENTION

For purposes of illustrating the invention and its applications, the following describes the utilization of the invention in forming optical elements such as optical modulators. An optical modulator is a device that converts data from an electrical to an optical format. For high-speed optical communications (>100 Mb/s), there are basically two types of modulators in use: the electro-absorption modulator (EAM) and the electro-optic (EO) modulator. The EAM is a semiconductor-based device that absorbs light when subjected to an electric field (i.e., the quantum Stark effect). The EAM is currently deployed for fiber optic systems that operate at or below the 2.5 Gb/s rate. For higher bit rates (10 Gb/s and beyond), the EAM has several drawbacks, including: the presence of chirp (spectral broadening brought on by a change in the device's refractive index, owing to the injection of carriers), limited modulation depth, and wavelength sensitivity. The EO modulator does not have these drawbacks. However, the EO devices now fabricated in bulk $LiNbO_3$ cannot be operated at both high speeds and low voltages and with a characteristic impedance in the preferred range of 50 ohms.

Figure 1:
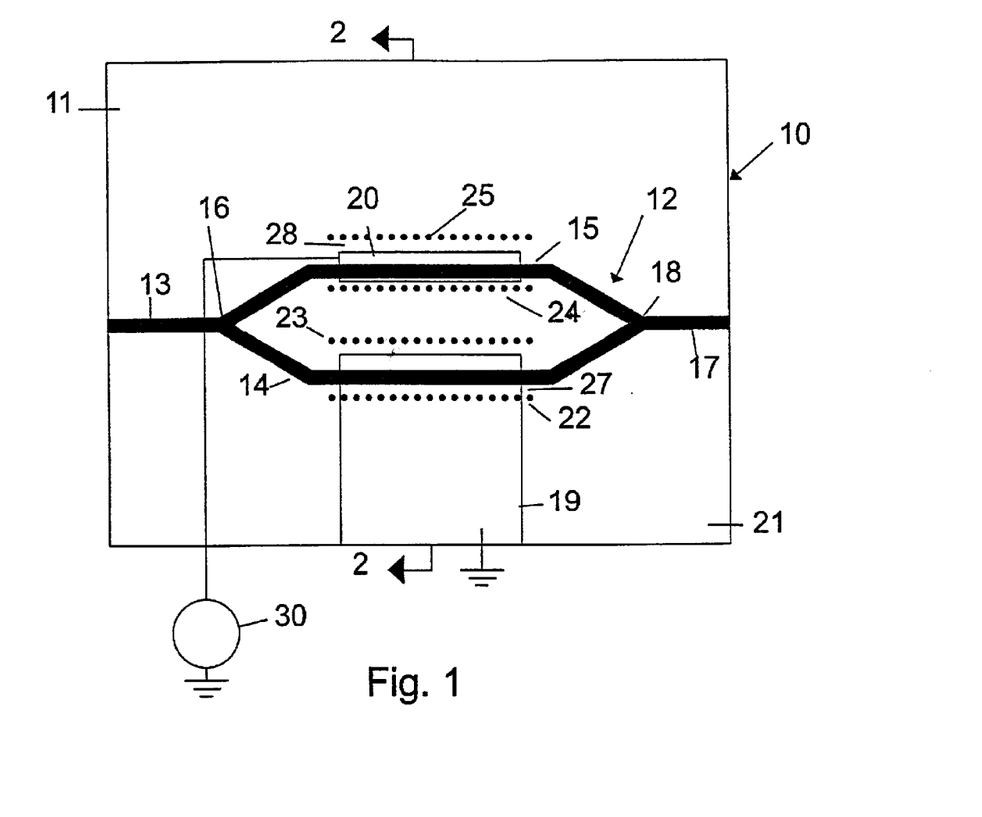
FIG. 1 is a schematic diagram of a Mach-Zehnder modulator incorporating the present invention.
Figure 2:
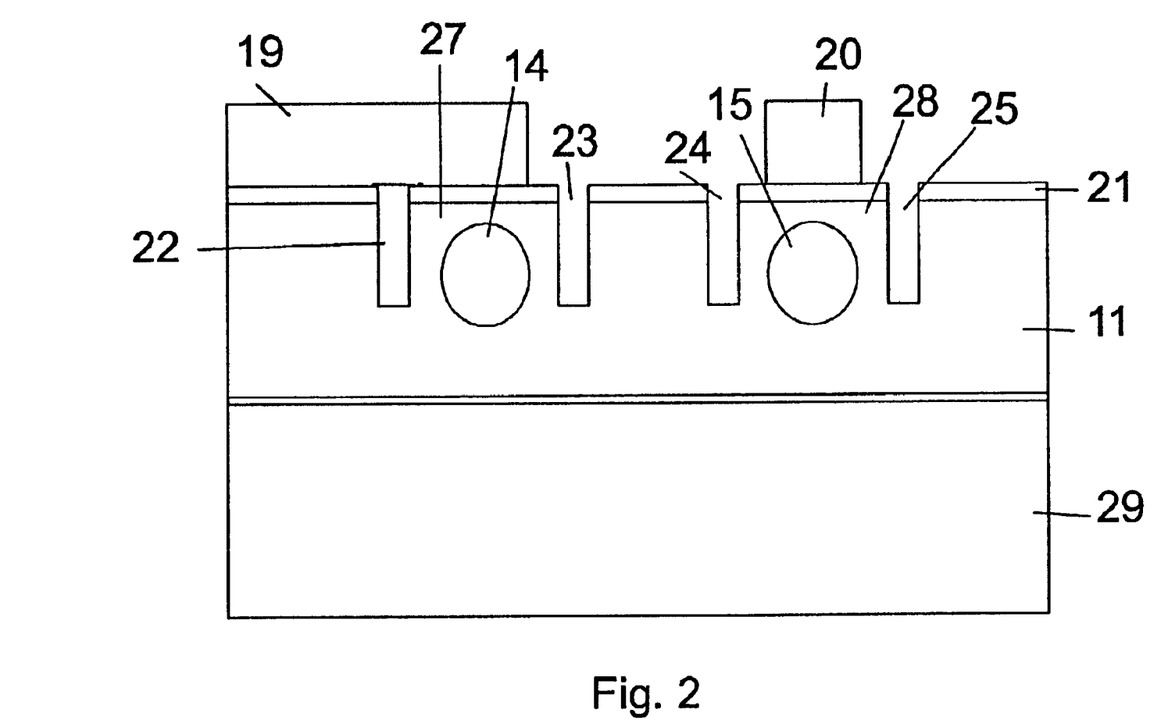
FIG. 2 is a simplified cross-sectional view of the Mach-Zehnder electro-optical modulator in accordance with the invention, taken generally along the lines 2—2 of FIG. 1.
Figure 4:
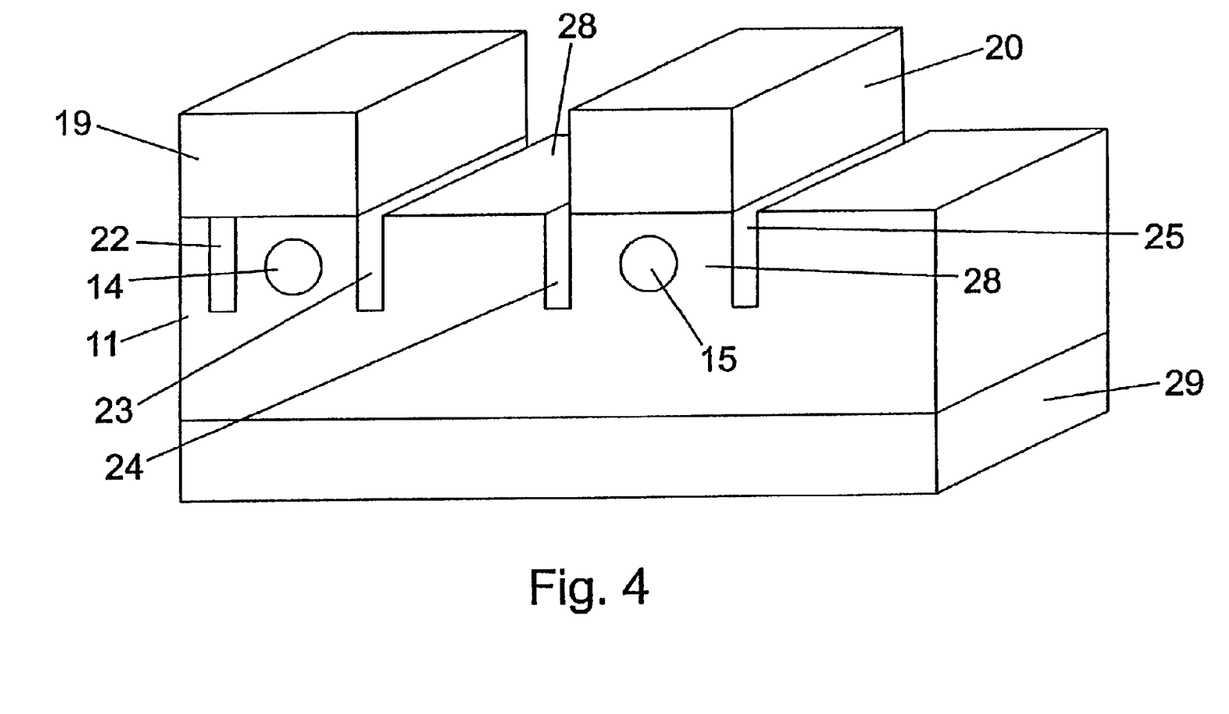
FIG. 4 is a simplified perspective view of a portion of the modulator structure of FIGS. 1–3.

The most commonly used EO modulator is based on the Mach Zehnder configuration of the type shown at 10 in FIG. 1. The modulator is formed in an electro-optical material 11 (conventionally, a substrate of single crystal lithium niobate) and includes a waveguide 12 having an input path 13, a first arm 14 and a second arm 15 that are split from the input path 13 at a splitter 16, and an output path 17 to which the first and second arms 14 and 15 are coupled at a coupler 18. Electrodes 19 and 20 are positioned to take advantage of the largest electro-optic coefficient in the material (e.g., $r_{33}$ in $LiNbO_3$). For a z-cut orientation, this corresponds to having both electrodes positioned directly above the waveguides 14 and 15, respectively. In this case, a thin (0.25–1 μm) dielectric layer 21 (e.g., $SiO_3$) is needed to isolate the electrodes 19 and 20 from the waveguides. Trenches 22, 23, 24 and 25 are formed in the electro-optic material 11 to compensate for microwave/optical velocity mismatch and to improve the microwave/optical field overlap. As discussed below, the material layer 11 is preferably formed as a thin layer on a substrate 29 (e.g., single crystal $LiNbO_3$) as shown in FIGS. 2 and 4. An electrical signal from a source 30 is used to produce an electric field in one arm 15 (or both arms) of the device 10; this electric field causes a change in the refractive index of the material in the arm or arms, which produces a relative change in the phase of the two light fields entering the coupler 18. The preferred electro-optic material 11 in which the arms 14 and 15 are formed is lithium niobate, $LiNbO_3$. At high modulation rates, it is necessary that the applied electrical signal and the light in the Mach-Zehnder arm travel with near-equal or equal velocities. In order to accomplish this, the electrodes 19 and 20 take the form of microwave striplines, and this type of modulator has come to be known as the traveling wave modulator (TWM).

The parameters used to judge the performance of a TWM are bandwidth, the drive voltage at the maximum frequency ($V_{3\,dB}$), characteristic impedance, modulation depth, and insertion loss. The important characteristic parameters which control these performance parameters of the TWM are the following: electrode width and height, buffer layer thickness, $\alpha_m$ (electrode loss), L (electrode length), $\alpha_o$ (microwave stripline/waveguide propagation loss), $N_m$ (microwave effective index), $N_o$ (optical effective index), Z (characteristic impedance), Γ (the microwave/optical fields overlap), and Vπ @ DC, (switching voltage at zero modulation frequency).

Such devices preferably have a high bit rate at the lowest achievable drive voltage with the maximum modulation depth, and with an impedance that matches that of the drive electronics (typically 50Ω). The reality, however, is that it is very difficult to achieve all these specifications for a high-speed device. For example, one may have a device that operates at 40 Gb/s but possesses a large Vπ @ maximum bit rate=9V and low impedance of ~30Ω.

The present invention allows the preferred design objectives to be realized by manipulating the electro-optic material and morphological characteristics of the electro-optic material. This manipulation enables selection of both the microwave and optical properties in such a manner that all of the desired performance parameters can be simultaneously obtained. The present invention makes it possible to change the microwave effective index—without changing the optical effective index—by distributing a second dielectric material (e.g., air, $SiO_2$) in a region outside optical waveguides but within the region bearing the microwave signals.

The ability to manipulate the material and morphological characteristics is based on the ability to grow thin films of $LiNbO_3$ on a $LiNbO_3$ substrate, with various degrees of crystallinity (amorphous, polycrystalline, and crystalline), and then alter the state of their crystallinity. As an example, under the proper growth conditions, films of amorphous $LiNbO_3$ can be grown on a substrate of crystalline $LiNbO_3$. Such amorphous $LiNbO_3$ can be easily etched with conventional etchants (e.g., a 4% aqueous solution of HF will etch at a rate of >5 μm/min.). Thus, topological (morphological) features such as trenches, ridges, etc. can be defined by standard photolithographic processes and replicated in the amorphous $LiNbO_3$. Further, in accordance with the invention, this "engineered" film can be converted to a crystalline form. The electro-optic effect in $LiNbO_3$ requires the crystalline form of the material. One way to convert the amorphous $LiNbO_3$ to crystalline $LiNbO_3$ is by heating (annealing) at a high temperature (e.g., 900° C. to 1100° C.) in a lithium rich environment.

Figure 3:
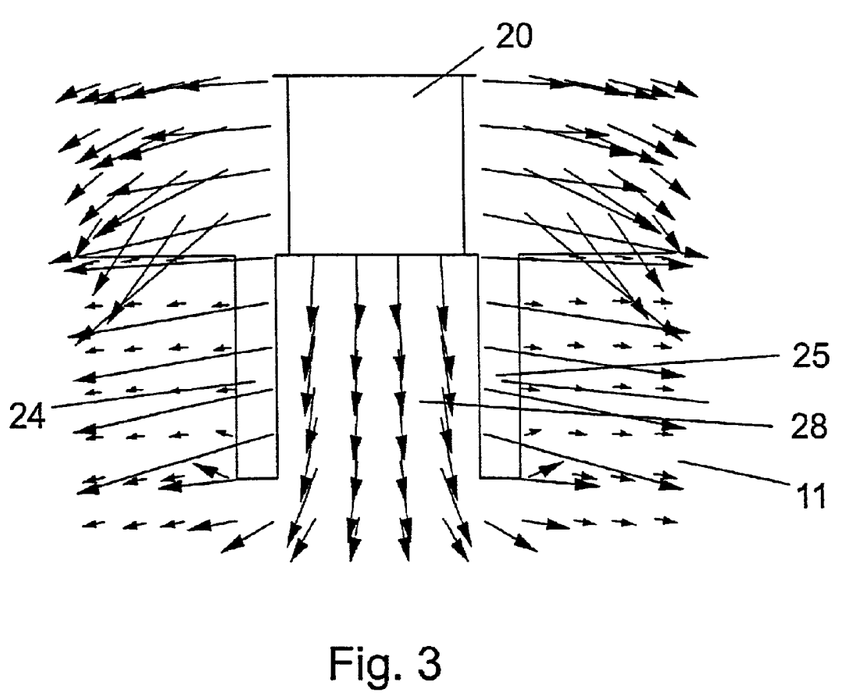
FIG. 3 is a schematic diagram of an electric field profile for a traveling wave electrode on an, e.g., lithium niobate layer into which has been etched a pair of deep trenches to define a ridge on which an electrode is formed.

As an example of the capabilities of this method, with reference to FIG. 3, a numerical simulation was made of the effect of (with reference to the type of structure shown in FIGS. 1 and 2) a pair of trenches 24 and 25, 5 μm deep by 4 μm wide, bracketing an electrode 20 of a TWM. As can be seen from FIG. 3, the electric field emanating from the electrode 20 has been focused along the vertical direction into the region 28 between the trenches 24 and 25. Without the trenches 24 and 25, the electric field would radiate nearly omnidirectionally in the lower half-plane. This electric field confinement results in a significant increase in the microwave field/optical field overlap. In this particular example, the overlap, Γ, is increased from Γ~0.5 to 0.8. Reduced drive voltage is a direct consequence of this increased overlap. In addition, size, geometry and position of trenches permit the control of the microwave index ($N_m$), and the characteristic impedance (Z). As seen in FIG. 3, the direction of the electric field can be dramatically changed across boundaries with large differences in the dielectric constant. This suggests that the electric fields can be refracted or bent to improve the microwave/optical overlap (e.g., increasing the horizontal component of the electric field from surface electrodes on x-cut $LiNbO_3$).

As an example, a modulator in accordance with the invention having a Mach-Zehnder structure as shown in FIGS. 1–4 may be formed in a $LiNbO_3$ layer 11 on a $LiNbO_3$ substrate 29. 30 μm thick electrodes 19 and 20 are formed over the waveguide arms 14 and 15 and a 0.5 μm dielectric layer 21 that separates the conductors 19 and 20 from the layer 11. Numerical simulation of a 40 Gb/s NRZV (30 GHz BW) TWM modulator with this form shows an impedance of 48.5Ω and a drive voltage $V_\pi$ @ DC of 2.8 volts (which corresponds to V3 dB electrical @ 30 GHz=4.0 V). As a comparison, a commercial 40 Gb/s modulator available from Lucent Technology has an advertised impedance of 47Ω, and a drive voltage of $V_\pi$ @ DC of 6 volts (which corresponds to $V_\pi$ @ 30 GHz=8.8 V). The simulated structure thus shows approximately a 50% decrease of drive voltage over that of the present commercial level. Examples of results from the simulation are given in Table 1 below.

TABLE 1

Fixed parameters
Electrode Geometry: SCPW; tb = 0.5 μm; wel = 8 μm; Gel = 34 μm
ao = 0.4 dB/Hz^½; italics: ao = 0.2 dB/Hz^½

| Function | BW | L | d × w | Γtot/Gel | Vπdc | V3dBe | Z(Ω) | ΔN/No |
|---|---|---|---|---|---|---|---|---|
| 10 Gb/s | 15 | 3.9 | 7 × 18 | 0.047 | 2.6 | 3.8 | 46 | 0.074 |
| 10 Gb/s | 16 | 6 | 9 × 28 | 0.044 | 1.8 | 2.6 | 48 | 0.028 |
| 40 Gb/s-NRZ | 30 | 3.9 | 9 × 28 | 0.044 | 2.8 | 4 | 48 | 0.028 |
| 40 Gb/s-RZ | 47 | 3.9 | 10 × 28 | 0.042 | 2.9 | 4.1 | 49 | 0.014 |
| *40 Gb/s-RZ* | *51* | *3.1* | *10 × 20* | *0.043* | *2.8* | *4.1* | *48* | *0.023* |
| ~60 Gb/s-RZ | 64 | 3.9 | 12 × 22 | 0.040 | 3 | 4.3 | 50 | 0.005 |

A preferred $LiNbO_3$ TWM in accordance with the invention as discussed above has a Mach Zehnder waveguide geometry, microwave stripline electrodes, and an isolating layer (called the buffer layer) between them. Exemplary fabrication steps in accordance with the invention for forming such structures are as follows:

1. Deposit amorphous $LiNbO_3$ layer 11 on a substrate 29. The substrate may be $LiNbO_3$, or another material of lower (e.g., sapphire) or higher (e.g., silicon) refractive index than $LiNbO_3$. The film should be sufficiently thick to encompass an optical waveguide (e.g., ~7 μm @ 1.55 μm wavelength). Dopants may be added during growth to provide for enhanced optical or microwave features (e.g., optical gain via $Er^{3+}$ doping), or to introduce the optical waveguides, (e.g., with Ti).

2. Modify film morphology. For example, define trenches 22, 23, 24, and 25 on the film surface via photolithography.

3. Anneal (e.g., at 900°1100° C. for several hours) to convert the remaining amorphous material layer 11 to crystalline $LiNbO_3$.

4. If necessary, pole the $LiNbO_3$ thin film 11 by applying an electric field (e.g., ~22 kV/mm for congruent $LiNbO_3$).

5. Fabricate waveguide elements 13–18. Typical methods include diffusion of Ti strips or proton exchange across an open feature in a mask.

6. Overlay low index buffer layer 21, if necessary.

7. Photolithographically define electrodes 19 and 20. This may involve electroplating to bring the electrode to the desired thickness.

Figure 5:
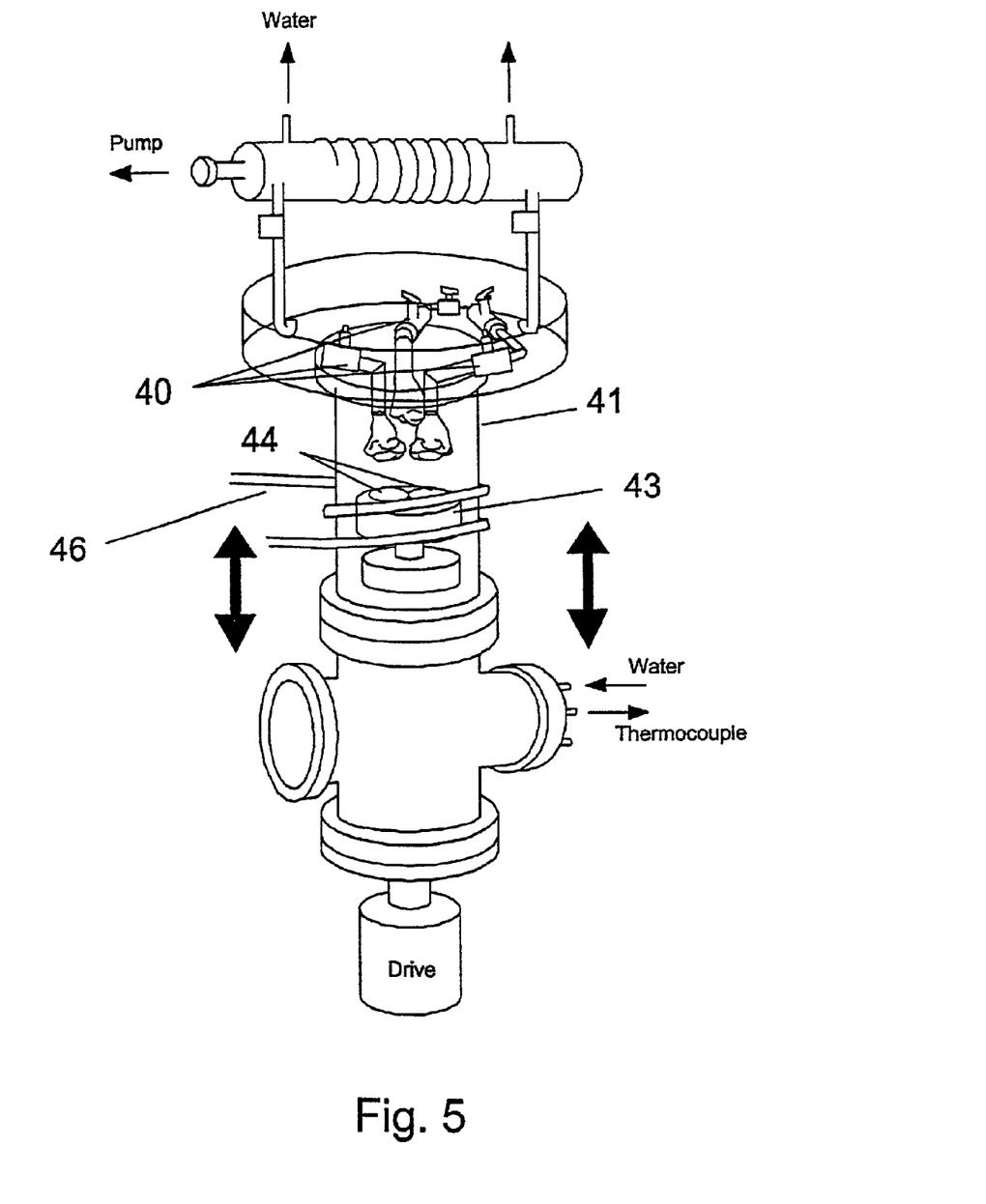
FIG. 5 is a schematic view of a low pressure thin film CVD reactor that may be utilized in carrying out the present invention.
Figure 6:
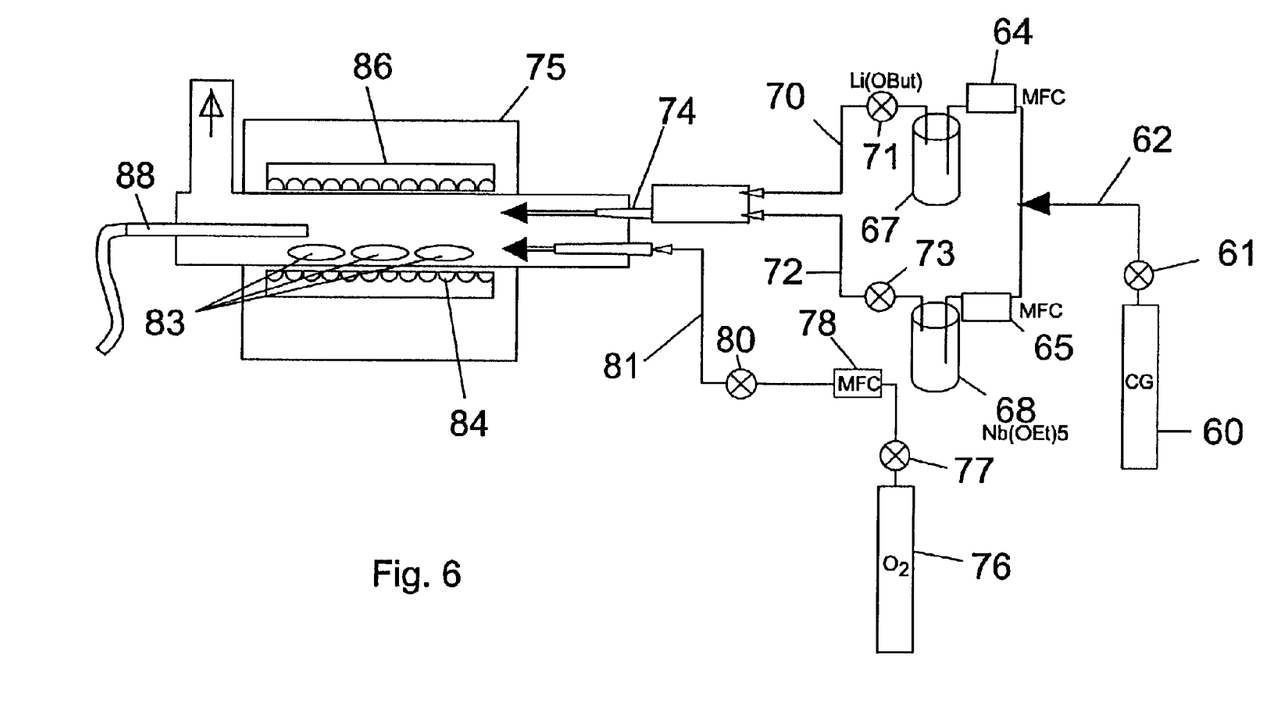
FIG. 6 is a schematic view of an atmospheric pressure CVD system that can be used for carrying out the present invention.

FIG. 5 is a diagram of a low pressure chemical vapor deposition (CVD) reactor that may be utilized in forming the layer 11, and FIG. 6 shows an atmospheric pressure CVD reactor that may be utilized. The reactor of FIG. 5 uses inductive heating via an external coil, whereas the reactor of FIG. 6 uses an external oven and/or may use a flammable gas to be burned with the injected precursors.

A first film exemplary growth process for the $LiNbO_3$ layer 11 is the following: A carrier gas (e.g., $N_2$), mixed with $O_2$ (e.g., 75% $N_2$, 25% $O_2$), is bubbled through precursor solutions containing metal alkoxides (e.g., lithium t-butoxide (Li-t-OBu), niobium ethoxide (NbOEt), or lithium-niobium ethoxide (LiNb(Oet)$_6$). The solutions may be heated to enhance the volatilization of the solutions. The vaporized precursor is injected via nozzles 40 into a reactor tube 41, which has a substrate holder 43 that supports the substrate(s) 44 onto which the LiNbO$_3$ film is to be deposited. Precursor gas flow rates are controlled. Pressure in the reactor tube 41 is typically in the range between 0.1 Torr and atmospheric pressure. The whole tube 41 and its contents may be heated (e.g., via an oven), or the substrate 44 alone may be heated via an alternating electric field from a coil 46 coupled to a resistive substrate holder 43 (induction heating). The substrate holder 43 may be rotated to make the deposition more uniform. Growth of amorphous LiNbO$_3$ occurs typically in a temperature range at or below 600° C. Deposition rates are about 2 $\mu$m/h. Deposition rates can be increased by introducing active carrier gases such as trimethylcholorsilane to reduce concentration of gaseous components containing hydroxyl groups. The amorphous LiNbO$_3$ film etches at a rate of about 5 $\mu$m/min in an aqueous 25% solution of HF. The amorphous LiNbO$_3$ film is then annealed at 900° C.–1100° C. for several (e.g., 6) hours in a ceramic container with powdered LiNbO$_3$.

Previous chemical-based LiNbO$_3$ film growth has been limited to ~100 nm/h. In accordance with the invention, the first process as discussed above carries out CVD growth at higher (near atmospheric) pressures to suppress the desorption processes responsible for poor growth rates, allowing growth rates ~2 $\mu$m/h to be attained. A second process, in accordance with the invention, is based upon an elucidation of the film growth chemistry, and uses a reactive carrier gas to modify the growth chemistry so as to increase growth rates. This second approach has several important consequences. Film growth experiments indicate that the addition of a common organic chlorinating agent, trimethylchlorosilane, Me$_3$SiCl, to the chamber along with the Nb(OEt)$_5$ precursor results in a doubling of the growth rate. Concommittant synthetic experiments have shown that Me$_3$SiCl easily chlorinates Nb(OEt)$_5$ at room temperature, yielding mixed Nb(OEt)$_{5-n}$Cl$_n$ species, along with the volatile and stable silyl ether by-product, Me$_3$SiOEt. For example, a 1:1 mixture of Nb(OEt)$_5$ and Me$_3$SiCl monitored by proton nuclear magnetic resonance (NMR) over 3 days reveals the gradual disappearance of peaks due to Nb(OEt)$_5$, and the appearance of peaks due to Nb(OEt)$_4$Cl: terminal OCH$_2$CH$_3$ 1.205 ppm, triplet, J=7.0 Hz; bridging OCH$_2$CH$_3$ 1.451 ppm, triplet, J=7.0 Hz; terminal OCH$_2$CH$_3$ 4.573 ppm, quartet, J=Hz; bridging OCH$_2$CH$_3$ 4.479 ppm, broad unresolved multiplet. Similarly, the $^{93}$Nb NMR peak due to Nb(OEt)$_5$ decreases in intensity over the course of the reaction, while a peak at –1124 ppm (upfield from [Et4N][NbCl$_6$]), attributed to Nb(OEt)$_4$Cl, grows in intensity. The generation of the Me$_3$SiOEt by-product is confirmed by the observation of $^1$H peaks at 1.088 ppm (triplet, J=7.0 Hz, CH$_3$), 3.495 ppm (quartet, J=7.0 Hz, CH$_2$), and a singlet at 0.63 ppm (SiMe$_3$). These results reveal the facile, co-operative inter-ligand decomposition mechanism that is responsible for the higher growth rates observed in the presence of Me$_3$SiCl. Further work has shown that the kinetics of the precursor decomposition process, and the thermal stability of the intermediates, can be modulated by both the substitution number, n, and the nature of R in the generic intermediate NbCl$_{5-n}$(OEt)$_n$. For example, reaction of the frequently used Nb precursor NbCl$_5$ with ethanol in a 1:1 ratio at room temperature generated not the anticipated NbCl$_4$(OEt), but the species Nb(=O)Cl$_3$ (identified by single crystal X-ray diffraction) and the volatile products HCl and ethyl chloride, EtCl (identified by gas phase infrared spectroscopy). Of utmost importance is that the volatile organic, ethanol, reacts readily at low temperatures to convert a Nb—Cl bond to a Nb=O moiety, precisely the chemical film component desired for the formation of LiNbO$_3$ from Nb$_2$O$_5$. Again, the by-products, HCl and EtCl, are stable gases, easily removed from the film growth surface. Thus for the series NbCl$_{5-n}$(OMe)$_n$, ease of precursor decomposition decreases, and compound stability increases, with an increasing value of n. Expanding on these results we have found that the stability of NbCl$_{5-n}$(OEt)$_n$ likewise increases with n, and are on a whole significantly more stable than the ethoxide derivatives. For example, while for n=1, the ethoxide NbCl$_4$(OEt) decomposes at room temperature, NbCl$_4$(OMe) decomposes at ~75° C., and the methoxide NbCl$_2$(OMe)$_3$ is stable to over 170° C. Thus, any number of precursor-carrier gas combinations may be utilized, which are able to satisfy a large range of kinetic and thermodynamic film growth or processing requirements.

Structures made of materials with a different dielectric constant, such as SiO$_2$, can be overgrown with the amorphous LiNbO$_3$. The amorphous LiNbO$_3$ can then be crystallized by the aforementioned annealing process. Furthermore, amorphous LiNbO$_3$ can be grown and crystallized on either z-cut or x-cut LiNbO$_3$. LiNbO$_3$ can also be grown as a crystalline material on other substrates such as sapphire.

The lithium niobate film growth procedure by chemical vapor deposition at atmospheric pressure includes two steps: the first step—deposition of an amorphous lithium niobate film at a temperature at or below 600° C. and the second step—crystallization annealing at a temperature in the range from 900° C. through 1100° C. FIG. 6 illustrates a metal organic chemical vapor deposition (CVD) system that can be used for lithium niobate growth in accordance with this process. A carrier gas canister 60, typically containing a mixture of oxygen and nitrogen or helium (e.g., 23% oxygen, 77% nitrogen) is connected through a valve 61 and supply lines 62 to mass flow controllers 64 and 65. The mass flow controller 64 controls the supply of carrier gas to a precursor bubbler 67 for lithium t-butoxide (Li(OBut), and the mass flow controller 65 controls the supply of carrier gas to a precursor bubbler 68 for niobium ethoxide (Nb(OEt)$_5$). An outlet line 70 with valve 71 extends from the bubbler 67 and an outlet line 72 with valve 73 extends from the bubbler 68 to a mixing zone 74 of the gas inlet system of a CVD furnace 75. Oxygen may also be supplied to the furnace from a canister 76 through a valve 77, mass flow controller 78, valve 80, and supply line 81. The substrates 83 to be treated are held on a substrate carrier 84 within a reactor enclosure 86 in the furnace. Alternatively, a radio frequency (RF) coil may be utilized, if desired, to inductively heat the substrates. A temperature sensor 88 (e.g., a thermocouple) is used to monitor the temperature adjacent the substrates 84. The delivery gas lines 70 and 72 preferably are always kept at a temperature over 150° C. to prevent deposition inside the lines, and the bubblers 67 and 68 are heated to get the pressure of the precursors into the range of 0.1–1 Torr (e.g., 150° C. and 190° C. for niobium penta-ethoxide and lithium t-butoxide respectively.) The optimal flow rates are about 0.5 slpm. At these conditions the film deposition (growth) rate can be about 2 microns per hour or even higher (lower growth temperature results in higher growth rate). The films growing at the first step show different degrees of crystallinity depending on the growth temperature. Films grown at temperatures below 650° C. are an amorphous lithium niobate, and films grown at temperatures in the range from 700° C. to 900° C. are polycrystalline material. (Note that films grown even at 600° C. could be expitaxial—i.e., crystalline—if the growth rate is smaller than 0.2 microns per hour.) In accordance with the present invention, amorphous and polycrystalline lithium niobate are recrystallized by high temperature annealing (annealing temperature>900° C.). In contrast to the as-grown sample for which X-ray diffraction reveals featured polycrystalline arcs, annealed samples exhibit good crystal structure. This two-step growth method allows the growth of epitaxial lithium niobate films with a growth rate over 1 micron per hour. For comparison, crystalline lithium niobate films grown at temperatures>900° C. have growth rates below 0.1 microns per hour.

The following are examples of processes carried out with the atmospheric pressure CVD system of FIG. 6 to grow amorphous $LiNbO_3$ films. Substrates (about 1 $cm^2$, c-cut $LiNbO_3$) were loaded into the horizontal reactor 86, which was heated in the furnace 75. Before growth the substrates were annealed at 1100° C. for 1 hour. Growth of amorphous films was typically carried out at about 650° C. Films were deposited from lithium t-butoxide and niobium ethoxide (maintained at 190° C. and 150° C., respectively). The delivery gas line 70 was kept at 150° C. to prevent deposition inside the line. A carrier gas of 23% oxygen and 77% nitrogen was bubbled through the precursors at a flow rate ~0.5 slpm. Film growth rate and film crystallinity are highly dependent on reactor temperature. Under the conditions employed here, a growth rate of ~2 $\mu$m/h was observed at reactor temperatures between ~500° C. and 750° C. The chemical composition of the amorphous $LiNbO_3$ films was examined with Auger electron spectroscopy using films grown on (111) Si to obviate surface charging. No elemental carbon was detected in a typical film. The amorphous films were crystallized by annealing them in a closed ceramic container containing powdered $LiNbO_3$. To further insure an adequate lithium oxide pressure over the films, the samples were also covered with a bulk $LiNbO_3$ wafer segment. Annealing was performed for one hour at 900° C.–1100° C. Thickness measurements on patterned films were performed with a profileometer.

High growth rates or lower growth temperatures generate amorphous, as opposed to polycrystalline or epitaxial, lithium niobate films. Films grown between about 500° to 650° C. were amorphous, as evidenced by a diffuse x-ray diffraction band overlaying weak diffraction peaks from the substrate. After a one hour post-growth anneal at 1100° C., X-ray diffraction scans using a 2-D X-ray detector and pole plots derived from them show the previously amorphous film grown at 650° C. to be single crystal. The single-crystal epitaxial nature of the annealed $LiNbO_3$ layer was confirmed by transmission electron microscopy (TEM) using a JEOL 2010F field emission transmission electron microscope operated at 200 kV. The cross-sectional TEM image of the $LiNbO_3$ layer after annealing taken under [$\bar{2}$110] two-beam bright field conditions were consistent with single crystal structure. No interface between the film and the substrate, or associated defects, was visible under different sets of two-beam imaging conditions, consistent with a high quality crystalline film and intermixing at the interface. Analysis of selected area diffraction patterns (SADPs) obtained from different areas of the film only, and also form areas containing both the film and substrate, confirmed that $LiNbO_3$ film is epitaxial single crystal. The typical SADP taken from the same area containing both the film and the substrate consists of one set of spots and corresponds to the [01$\bar{1}$0] zone of the rhombohedral $LiNbO_3$ crystal structure with a=0.515 nm, c=1.386 nm, space group R3c (161). This SADP demonstrates that there is no difference in crystal structure, orientation or crystal quality between the deposited and annealed $LiNbO_3$ film and the substrate. The TEM analysis proved the high-quality crystallized $LiNbO_3$ layer to be free of segregations of a second phase and extended defects. Films grown at higher temperatures (about 700° to 750° C.) exhibited diffraction rings in the X-ray spectra characteristic of polycrystalline films.

Advantage can be taken of the rapid etch rate of amorphous $LiNbO_3$ (~7 $\mu$m/min. in 4% HF at room temperature) to pattern the film before annealing to crystallinity, e.g., photolithographically patterning, $HF:H_2O$ etching and then annealing the $LiNbO_3$ film. A non-optimized RIE etch using a 29:2::$CF_4:O_2$ gas mixture and 50 W RF power was found to etch the amorphous $LiNbO_3$ about 20-fold faster than for crystalline or polycrystalline $LiNbO_3$ under the same conditions. The bulk film diffusion processes which occur at annealing temperatures during crystallization are found to be more effective than the surface mobility in altering the structure of the resulting film.

A lift-off technique may also be used in accordance with the invention to shape lithium niobate thin films. As an example, a photolithographically patterned $SiO_2$ mask atop a crystalline lithium niobate substrate was overgrown with polycrystalline lithium niobate, with the lithium niobate grown on the substrate where it is exposed by the patterned $SiO_2$. The $SiO_2$/lithium niobate mask was etched away in an aqueous HF solution to leave the lithium niobate grown on the substrate, and the structure was annealed. The resulting patterned film featured 1 $\mu$m thick by 40 $\mu$m wide single crystal $LiNbO_3$ ridges (as determined by X-ray diffraction). Lift-off processes are not often successfully applied to perovskite films because the high temperatures necessary for epitaxial perovskite growth typically induce reaction or interdiffusion of the oxide and the mask material. As the deposition of amorphous lithium niobate in the present process takes place at much lower temperatures than epitaxial growth, mask-oxide interactions are less of an issue, and lift-off processes can be used as patterning technique.

Various precursors may be used in the processes in accordance with the invention. These include, for example, niobium penta-alkoxides (e.g., methoxides, ethoxides, iso-propoxides) and lithium-niobium alkoxides (e.g., methoxides, ethoxides, and iso-propoxides).

As noted above, amorphous lithium niobate has a much higher etching rate for wet etching with common liquid etchants such as HF acid, as well as for dry etching with dry etchants such as a $CF_4:O_2$ mixture. In both cases the etching rate can be higher than 2 microns per hour (for comparison, the wet etching rate of crystalline and polycrystalline lithium niobate is below 0.1 micron per hour), permitting the practical development of planar technology in lithium niobate devices.

It is understood that the invention is not limited to the embodiments set forth herein as illustrative, but embraces all such forms thereof as come within the scope of the following claims.

What is claimed is:

1. A method for forming a crystalline film of lithium niobate comprising:
   (a) providing a substrate;
   (b) growing an amorphous film of lithium niobate on the substrate by chemical vapor deposition; and
   (c) annealing the lithium niobate film for a time and at a temperature sufficient to convert the film from an amorphous to a crystalline form; and (d) wherein after the step of growing an amorphous film of lithium niobate and before the step of annealing the lithium niobate film, further including etching a selected region of the amorphous lithium niobate film.

2. The method of claim 1 wherein growing an amorphous film is carried out at or near atmospheric pressure.

3. The method of claim 1 wherein the substrate is formed of a material selected from the group consisting of $LiNbO_3$, $Al_2O_3$, $LiTaO_3$, and Si.

4. The method of claim 1 wherein the substrate is crystalline lithium niobate.

5. The method of claim 1 wherein the step of growing an amorphous film is carried out at temperatures in the range of 500° C. to 650° C.

6. The method of claim 1 wherein the step of growing an amorphous film is carried out at temperatures at or below about 600° C.

7. The method of claim 1 wherein the step of growing an amorphous film is carried out in an atmosphere containing precursors selected from the group consisting of lithium t-butoxide, niobium penta-alkoxides, and lithium niobium alkoxides.

8. The method of claim 1 wherein the step of annealing the lithium niobate film is carried out at a temperature of at least 800° C.

9. The method of claim 1 wherein the step of etching is carried out by masking the amorphous lithium niobate film to leave exposed areas on the amorphous lithium niobate film and wet etching the exposed areas with a liquid etchant.

10. The method of claim 1 wherein the step of etching is carried out by masking the amorphous lithium niobate film to leave exposed areas of the amorphous lithium niobate film and etching the exposed areas with a dry etchant.

11. A method for forming crystalline films of lithium niobate comprising:
(a) providing a substrate;
(b) growing an amorphous film of lithium niobate on the substrate in a chemical vapor deposition chamber in an atmosphere containing niobium lithium precursors and an organic chlorinating agent; and
(c) annealing the lithium niobate film for a time and at a temperature sufficient to convert the film from an amorphous to a crystalline form.

12. The method of claim 11 wherein the substrate is formed of a material selected from the group consisting of $LiNbO_3$, $Al_2O_3$, $LiTaO_3$, and Si.

13. The method of claim 11 wherein the substrate is lithium niobate.

14. The method of claim 11 wherein the step of growing an amorphous film is carried out at temperatures between about 500° C. and 650° C.

15. The method of claim 11 wherein the step of growing an amorphous layer is carried out at temperatures below about 600° C.

16. The method of claim 11 wherein the step of growing an amorphous film is carried out in an atmosphere containing precursors selected from the group consisting of lithium t-butoxide, niobium ethoxide, and lithium niobium ethoxide.

17. The method of claim 11 wherein the step of annealing the lithium niobate film is carried out at a temperature of at least 800° C.

18. The method of claim 11 wherein the organic chlorinating agent is trimethylchlorosilane.

19. The method of claim 11 wherein after the step of growing an amorphous film of lithium niobate and before the step of annealing the lithium niobate film, further including etching a selected region of the amorphous lithium niobate film.

20. The method of claim 19 wherein the step of etching is carried out by masking the lithium niobate film to leave exposed areas on the amorphous lithium niobate film and wet etching the exposed areas with a liquid etchant.

21. The method of claim 19 wherein the step of etching is carried out by masking the amorphous lithium niobate film to leave exposed areas of the lithium niobate film and etching the exposed areas with a dry etchant.

22. The method of claim 11 wherein growing an amorphous film is carried out at or near atmospheric pressure.

23. A method of forming crystalline lithium niobate structures comprising:
(a) providing a substrate;
(b) forming an amorphous film of lithium niobate on the substrate;
(c) etching a selected region of the amorphous lithium niobate film; and
(d) annealing the lithium niobate film for a time and at a temperature sufficient to convert the film from an amorphous to a crystalline form.

24. The method of claim 23 wherein the step of forming the amorphous film is carried out by chemical vapor deposition at or near atmospheric pressure.

25. The method of claim 23 wherein the step of forming an amorphous film is carried out at temperatures between about 500° C. and 650° C.

26. The method of claim 23 wherein the step of forming an amorphous film is carried out at temperatures below about 600° C.

27. The method of claim 23 wherein the step of forming an amorphous film is carried out in an atmosphere containing precursors selected from the group consisting of lithium t-butoxide, niobium penta-alkoxides, and lithium niobium alkoxides.

28. The method of claim 23 wherein the substrate is formed of a material selected from the group consisting of $LiNbO_3$, $Al_2O_3$, $LiTaO_3$, and Si.

29. The method of claim 23 wherein the substrate is lithium niobate.

30. The method of claim 23 wherein the step of annealing the lithium niobate film is carried out at a temperature of at least 800° C.

31. The method of claim 23 wherein the step of forming an amorphous lithium niobate film is carried out in a chemical vapor deposition or chemical beam epitaxy chamber in an atmosphere containing niobium and lithium precursors and an organic chlorinating agent.

32. The method of claim 31 wherein the chlorinating agent is trimethylchlorosilane.

33. The method of claim 23 wherein the step of etching is carried out by masking to leave exposed areas on the amorphous lithium niobate film and wet etching the exposed area with a liquid etchant.

34. The method of claim 23 wherein the step of etching is carried out by masking the amorphous lithium niobate film to leave exposed areas of the lithium niobate film and etching the exposed areas with a dry etchant.

35. The method of claim 23 wherein the step of etching is carried out to form a trench in the amorphous film, and further including filling the trench with a selected material and growing amorphous lithium niobate over the filled trench and onto adjacent regions of the amorphous lithium niobate film before annealing the lithium niobate film.

36. The method of claim 35 wherein in the step of filling the trench, the trench is filled with $SiO_2$.

37. A method for forming a crystalline film of lithium niobate comprising:

(a) providing a substrate;
(b) forming a layer of $SiO_2$ on the substrate in a pattern;
(c) growing a polycrystalline film of lithium niobate over the layer of $SiO_2$ and on the substrate where it is exposed by the pattern of the $SiO_2$ layer;
(d) etching away the $SiO_2$ layer to remove the lithium niobate on the $SiO_2$ layer to leave the lithium niobate that is on the substrate; and
(e) annealing the lithium niobate film for a time and at a temperature sufficient to convert the film to a crystalline form.

38. The method of claim 37 wherein the substrate is formed of a material selected from the group consisting of $LiNbO_3$, $Al_2O_3$, $LiTaO_3$, and Si.

39. The method of claim 37 wherein the substrate is crystalline lithium niobate.

40. The method of claim 37 wherein the step of annealing the lithium niobate film is carried out at a temperature of at least 800° C.

41. The method of claim 37 wherein the step of etching is carried out to form a trench in the polycrystalline film, and further including filling the trench with a selected material and growing lithium niobate over the filled trench and onto adjacent regions of the lithium niobate film before annealing the lithium niobate film.

42. The method of claim 41 wherein in the step of filling the trench, the trench is filled with $SiO_2$.

* * * * *